Dec. 25, 1956 J. ENSINK 2,775,647

SINGLE SIDEBAND CARRIER-WAVE TELEPHONE SYSTEM

Filed Sept. 24, 1951

INVENTOR
Johannes Ensink
By Fred M Vogel
Agent

United States Patent Office 2,775,647 Patented Dec. 25, 1956

2,775,647

SINGLE SIDEBAND CARRIER-WAVE TELEPHONE SYSTEM

Johannes Ensink, Hilversum, Netherlands, assignor to Hartford National Bank and Trust Company, Hartford, Conn., as trustee Application September 24, 1951, Serial No. 248,046

Claims priority, application Netherlands September 28, 1950

6 Claims. (Cl. 179—15)

The invention relates to single sideband carrier-wave telephone systems for the simultaneous transmission of a plurality of calls, in which the channels are arranged in one or more groups, the channels of each group being arranged with the use of channel modulators in the group frequency band and in which, for each call, signals for call purposes and the like are, in addition, transmitted. Such systems usually require an expensive final apparatus, so that their use is economically feasible only if a large plurality of channels is transmitted through one cable for a considerable distance since in this case, because of the high cost of the cable, the cost of the final apparatus is comparatively decreased and will counterbalance the use of a plurality of cables.

The object of the invention is to provide a single sideband carrier-wave telephone system which is economically attractive even with short distance transmission.

The invention is based on the knowledge that a material portion of the cost of the final apparatus is represented by the filters used in this system and in the comparatively complicated signalling systems.

The system according to the invention has the feature that the frequency interval between the carrier waves of the channels is substantially equal to double the band width of the transmitted call side-band and that the signalling carrier-wave frequency lies outside the transmitted sideband.

Owing to the larger frequency interval between the carrier waves of the channels, the channel bandpass filters may be materially simplified, whereas the signal carrier-wave frequency within the frequency range of the channel not used by the call sideband may be such that the call does not interfere with the signalling.

As will be obvious hereinafter, the signalling amplifier may be used in common for all the channels of a group; in addition, the part of the signal receiver associated with the channel may be combined in part with the channel amplifier of this channel. In the system according to the invention the number of channels in a particular frequency band has been reduced substantially by half, it is true, but for short distance transmission the cost saved in the final apparatus largely compensates additional cost, if any, of cables.

Figure 1:
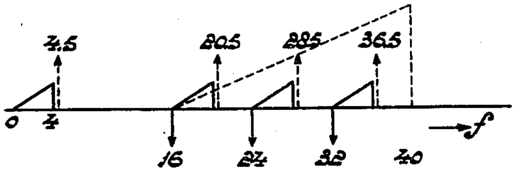
Figure 2:
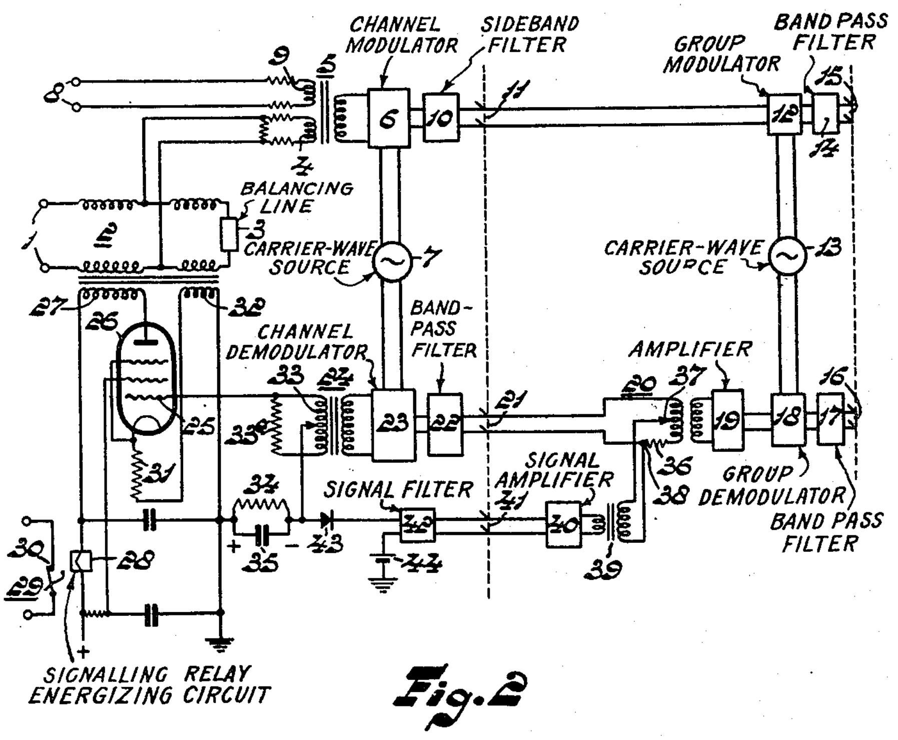

In order that the invention may be more clearly understood and readily carried into effect, it will now be described more fully with reference to the accompanying drawing, in which:

Fig. 1 shows the position of a channel and of a group comprising three channels as a function of the frequency $f$ in kc./s. and Fig. 2 shows diagrammatically part of the final apparatus of a system according to the invention, comprising a channel amplifier and a signal receiver.

Referring to Fig. 1, the call to be transmitted occupies the frequency band of 300 to 3400 c./s., which is indicated from 0 to 4 kc./s. for the sake of simplicity; the signalling carrier-wave frequency is 4.5 kc./s.

This call is modulated in a channel modulator on a carrier wave of 16 kc./s. The upper side band then obtained extends from 16 to 20 kc./s., whereas the associated signalling frequency is 20.5 kc./s.

A second call is modulated in a channel modulator on a carrier wave of 24 kc./s. and, after removing the lower sideband, the upper sideband remaining extends from 24 to 28 kc./s.; the signalling frequency for this channel is 28.5 kc./s.

Similarly, a third call is shifted with the use of a carrier-wave frequency of 32 kc./s. to the band of 32 to 36 kc./s.

Referring to the figure the group thus formed, extending from 16 to 40 kc./s. comprises only three channels, but it will be obvious that a greater number may be chosen, for example, a number of 6.

The intervals between the carrier waves of the channels are 8 kc./s. and consequently are twice the sideband width, whereas the signalling frequencies fall outside of the sideband to be transmitted.

If it is assumed for the sake of simplicity that a group comprises three channels and if the system is intended for the transmission of, for example, 9 channels, a second triad is shifted in a similar manner to the frequency range of 16 to 40 kc./s., which also applies to the third triad. Thus three groups are formed, each comprising three channels.

One of the groups may be modulated on a group carrier-wave with the use of a group modulator and be shifted in the frequency spectrum. The second group is modulated on a group carrier wave, which is chosen to be such that the shifted second group is adjacent to the first shifted group in the frequency spectrum. The third group is shifted so that, for example, it is adjacent to the shifted second group on the other side.

In this known manner, which is not shown in the figure, there is formed a super group which, in the case under consideration, comprises three groups each comprising three channels.

It will be obvious that, with a greater number of channels, a second super group may be formed in a similar manner, this group occupying the same place in the frequency spectrum.

These super groups may again be shifted and combined to form a hyper group.

It appears from the foregoing that there is a frequency difference of more than 4 kc./s. between the highest frequency of the first channel of the group and the lowest frequency of the second channel, so that the channel bandpass filters may be more simply constructed as the bandpass width may be enlarged and attenuation of the lowest and highest frequencies at the fringes of the band need not increase as rapidly as heretofore. The signalling frequency may be chosen to be at a suitable area inside the frequency range, for example, between 19.4 to 24.3 kc./s.

Referring to Fig. 1, a frequency of 20.5 kc./s. is indicated therefor, the frequency distance to the associated channel extending from 16.3 to 19.4 kc./s. consequently being smaller than the frequency distance from the next following channel, which starts at 24.3 kc./s.

During the signalling for a particular channel no call is made in this channel, whereas a call may be made in the next following channel, so that the frequency distance from the associated channel is smaller. If there is a call and if this slightly penetrates into the signalling circuit, it being nevertheless able to reach the channel amplifier, this will furthermore produce a slight interference primarily in its own channel, which is less harmful than if this interference were produced by a call of the next higher channel.

With this position of the signal frequencies, the transmitter and receiver channel filters are furthermore of relatively simple construction.

In the circuit-diagram shown in Fig. 2 a low-frequency call which is to be transmitted is supplied to the terminals 1 and through the split circuit 2 having a balancing line 3 to a primary winding 4 of the inlet transformer 5 for the channel modulator 6.

A carrier wave taken from the carrier-wave source 7 is supplied to the channel modulator 6 to shift the call to the correct area in the group frequency band.

The call signalling voltage is supplied to the inlet terminals 8 and through the primary winding 9 of the transformer 5 also to the channel modulator 6 and shifted to the correct area in the group frequency band.

The channel bandpass filter 10, which damps the lower sideband occurring upon modulation and allows the upper sideband to pass is coupled to modulator 6.

It should be noted that, although in the foregoing a width of the sideband of 4 kc./s. has been referred to, in practice the call band extends from 300 to 3400 c./s.

At 11 the outlet terminals of the bandpass filters of the various channels associated with one group are connected in parallel, for which purpose these bandpass filters may, if necessary, be provided with additional outlet sections so that this parallel connection may be established and connection circuits may also be provided on the right-hand side of the connecting area 11.

The group of channels formed at 11 is then supplied to the group modulator 12, the group being shifted by a carrier wave taken from the carrier-wave source 13 to the desired area in the frequency spectrum of the super group.

A group bandpass filter 14 and the outlets of a number of group bandpass filters are connected in parallel at 15 and coupled to group modulator 12.

If further groups of channels are formed, a subsequent modulator stage may be included, after which the frequency band finally obtained is, if necessary after the frequency shift, supplied to the transmission system.

An incoming super group of channels is supplied at 16 to a number of group bandpass filters, one of which is shown at 17.

The bandpass filter 17 passes one of the supplied groups. This group is supplied to the group demodulator 18 to produce in the outlet circuit of this demodulator, for example, the group of three channels shown in Fig. 1. After amplification if necessary, in the amplifier 19, the group is supplied through the split transformer 20, which will be explained more fully hereinafter, to the point 21, to which a number of parallel-connected channel bandpass filters are connected, one of which is shown at 22.

The bandpass filter 22 selects one of the channels of the group, for example, the channel having the lowest frequencies shown in Fig. 1, and supplies this channel to the channel demodulator 23, so that the channel is shifted to the low-frequency position of 300 to 3400 c./s.

This low-frequency signal is supplied through the transformer 24 to the control-grid 25 of the channel amplifying tube 26.

The amplified signal occurring across the anode circuit of the tube is supplied through the split transformer 2 to the terminals 1.

The anode circuit of the tube 26 comprises the series combination of the transformer winding 27 and the energizing circuit 28 of a relay 29.

If the direct anode current of the tube 26 reaches a particular value, a signalling device (not shown) is actuated by way of one or more contacts 30 of the relay 29.

The cathode circuit of the tube comprises the series combination of a resistor 31 and the transformer winding 32, of which one end is connected to a point of constant potential, for example, ground.

The control-grid circuit comprises the series combination of a part of the secondary winding 33 of the transformer 24 and a resistor 34.

A capacitor 35 is connected in parallel with the resistor 34 and a resistor 33*a* is connected in parallel with the winding 33.

The discharge tube 26 has a combined negative feedback, since the resistor 31 produces negative current feedback across the cathode circuit and the transformer windings 26 and 32 produce negative voltage feedback through the split transformer.

In order to obtain signalling with the use of relay 29, which is included in the anode circuit of the tube 26, the signal voltage must act upon the direct current across the anode circuit.

Therefore the split transformer 20 is included in the call transmission path.

One branch of this split transformer is formed by the impedance produced by the parallel combination of the channel bandpass filters and any impedance correction means, on the left-hand side of 21. The other branch, comprising a resistor 36, balances substantially the impedance of the first-mentioned branch for call channel frequencies.

Little, if any, voltage is produced across the branch connected between tap 37 and point 38 during the transmission of calls.

Since, as is evident from Fig. 1, the signalling frequencies occurring in the group differ rather considerably from the channel frequencies, particularly in view of the fact that a call only extends to 3400 c./s., the impedance of the parallel-connected channel bandpass filters acts substantially as an imaginary impedance for these signalling frequencies.

Consequently these signalling frequencies are developed across the transformer 39 connected between points 37 and 38 and are supplied to the signal amplifier 40 common to all signalling frequencies of a group.

The amplified signalling voltage which, for example in a group shown in Fig. 1, exhibit frequencies of 20.5, 28.5 and 36.5 kc./s., are supplied at 41 to the parallel combination of a plurality of signalling filters one of which is shown at 42.

Since it was assumed above that the filter 22 selects the channel comprising the lowest frequencies of the group, the filter 42 passes the associated signalling frequencies of, in this case, 20.5 kc./s.

By means of rectifier 43, this signal is rectified, and a voltage of the polarity indicated is produced across the parallel combination 34, 35. The rectifying circuit may furthermore include a threshold voltage source 44.

Since this voltage is operative through the elements 33 and 33*a* at the control-grid of the tube 26 and since it is sufficiently high in magnitude due to amplification by the amplifier 40, the tube is cut off.

Consequently, if the signalling frequency is transmitted, the channel receiver is cut off.

During signalling the signalling frequency is supplied, for example, in the form of pulses, so that each time the negative bias voltage of the control-grid of the tube 26 is increased, this tube is cut off, the relay 29 is de-energized, and the signalling device becomes operative.

If a call is received, no negative bias voltage is produced across the parallel combination 34, 35 and the tube is conductive.

It should be noted that the invention is not restricted to the circuit-arrangement described above. Thus, for example, the polarity of the rectifier 43 may be reversed, the tube then conducting normally in the absence of a signalling voltage, and the relay 29 is not then energized. With signalling the direct anode current increases, and the relay is energized. As an alternative, spacing current signalling may be used.

It will be obvious that by using one signal amplifier 40 in common for all signalling voltages of one group, and by using a combined signal receiver and a channel amplifier comprising only one discharge tube, appreciable economy in the cost of the final apparatus is possible.

What I claim is:

1. A single side-band carrier wave telephone system for simultaneously transmitting the respective calling voltages conveyed in a plurality of channels, each calling voltage when intelligence information is sent out being constituted by an intelligence wave lying within a predetermined band and being constituted when signaling information is sent out by impulses whose frequency is above said band, said system comprising a plurality of base carriers spaced in frequency by intervals equal to twice the width of said band, a like plurality of channel modulators for imposing the calling voltage of each channel as a modulation on a respective carrier, filter means to derive from the output of each channel modulator a single side-band representative of the calling voltage therein, and means including a group modulator and an output filter to impose the group of single side-bands as a modulation on a common carrier to produce a group band for transmission, said system further including a like plurality of channel receivers for intercepting the transmitted group band, each receiver being provided with means to select a respective single side-band from the group band, means coupled to said selective means to separate the intelligence wave component from the signalling impulse component in the selected side-band, an electron discharge tube having a control grid and an anode and circuits therefor, a relay having a winding coupled to the anode circuit of said tube and a switch actuated by said winding, a signaling device having an operating circuit including said switch, means coupled to said separating means to apply the intelligence wave component to the grid of said tube to effect amplification of said wave, means coupled to said anode circuit to derive the amplified wave therefrom, a rectifying circuit, and means coupled to said separating means to apply the impulse component through said rectifier circuit to said grid to actuate said relay in said anode circuit.

2. A system, as set forth in claim 1, wherein said separating means includes a transformer having a primary winding coupled to said selective means and a split secondary having a branch yielding said intelligence wave component and a branch yielding said impulse component.

3. A system, as set forth in claim 2, wherein said separating means further includes a first bandpass filter responsive solely to the frequency of said impulse component and a second bandpass filter solely responsive to said intelligence wave component.

4. A single sideband multi-channel carrier wave telephone system for the simultaneous transmission of a plurality of calls, comprising means for producing a plurality of sideband-modulated carrier waves in channels arranged in a multiplicity of groups wherein frequency intervals between the carrier waves of the channels are substantially equal to twice the bandwidth of the sideband transmitted for each call and means by which signalling is effected for each channel comprising means for producing a plurality of signalling carrier waves associated respectively with each channel and being outside the transmitted sideband of the respective channel, and receiving terminal apparatus including means by which the signalling frequencies, belonging to the channels of one group, are jointly separated from that group before mutually separating the channels of that group, said last-named means comprising receiver means for receiving said one group of channels, first separating means for separating the modulated carrier waves of said one group, second separating means for separating the signaling frequencies of said one group, and coupling means connecting said receiver means jointly to said first and second separating means.

5. A system as claimed in claim 4, in which said coupling means comprises a transformer having a primary winding connected to said receiver means and a tapped secondary winding, and an impedance member connected in series combination with said secondary winding, said first separating means being connected across said series combination, and coupling means connecting the input of said second separating means between the taps on said secondary winding and the end of said impedance member which is relatively remote from said secondary winding.

6. A system as claimed in claim 5, in which said last-named coupling means comprises a signal amplifier adapted to amplify in common all of the signaling frequencies of said one group.

References Cited in the file of this patent

UNITED STATES PATENTS

| | | |
|---|---|---|
| 2,514,425 | Thompson | July 11, 1950 |
| 2,590,746 | Adler | Mar. 25, 1952 |
| 2,613,279 | Hurault | Oct. 7, 1952 |